United States Patent [19]

Liu et al.

[11] 4,135,313

[45] Jan. 23, 1979

[54] EDUCATIONAL TOY WITH ACTION

[76] Inventors: Hsing-Ching Liu; Lan-dih Liu, both of 3F, No. 213, Chung Ching N.Rd. Sec. 4, Taipei, Taiwan

[21] Appl. No.: 822,450

[22] Filed: Aug. 8, 1977

[51] Int. Cl.² .............................................. G09B 7/10
[52] U.S. Cl. ...................................................... 35/9 C
[58] Field of Search ................. 35/9 R, 9 B, 9 C, 9 D

[56] References Cited

U.S. PATENT DOCUMENTS

| | | | |
|---|---|---|---|
| 1,860,895 | 5/1932 | Marx | 35/9 C |
| 2,627,672 | 2/1953 | Polton | 35/9 C |
| 3,106,784 | 10/1963 | Raley | 35/9 C |
| 3,362,103 | 1/1968 | Neumann | 35/9 R X |
| 3,477,144 | 11/1969 | Stillit | 35/9 C |
| 3,834,042 | 9/1974 | Henry | 35/9 C |
| 3,902,256 | 9/1975 | Liu | 35/9 D |
| 3,994,078 | 11/1976 | Liu | 35/9 B X |

Primary Examiner—William H. Grieb

[57] ABSTRACT

An educational toy comprises a base and a statue mounted thereon. The statue has a movable head and arms. One of numerous replaceable question/answer plates is selectively placed over a quiz device which consists of an electrical conductive bottom layer, a non-conductive marking top layer, and an intermediate circuit layer sandwiched therebetween. A plurality of top opened holes are formed extending through the quiz device to said conductive bottom layer. Said plate is punched at the position corresponding to some of said holes in accordance with the question/answer combination. Two operating rods are provided for selective insertion in said holes to indicate a question and corresponding answer. If a correct answer is given, the statue will be actuated to produce an affirmative nodding and clapping action, whereas if an incorrect answer is given, the statute will render a negative wagging motion.

2 Claims, 3 Drawing Figures

EDUCATIONAL TOY WITH ACTION

The present invention relates generally to an educational toy and more particularly to an improved quiz and answer toy with action to indicate whether the answer is correct or wrong.

U.S. Pat. No. 3,994,078 which issued to one of the present co-inventors discloses an educational toy clock mainly comprising a base, an active statue mounted on the base, a series of replaceable quiz-and-answer plates, an electrical conducting disc, a couple of hands and corresponding switch boards, a plurality of driving means and the relevant mechanism, and a couple of signal circuits wherein when a correct answer is made by turning the hands above the quiz-and-answer plate, a circuit is closed to move a driving means for actuating a first mechanism within the statue to indicate by nodding and simultaneously clapping. On the other hand, when another wrong answer is made, a circuit is closed to move another driving means for actuating a second mechanism within the same statue to indicate disapproval by wagging the head.

It has been found that the quiz device in said U.S. Pat. No. 3,994,078 consisting of switch boards and electrical conducting disc is so complicated that the manufacturing cost has proven more than estimated.

Therefore, it is the primary object of this invention to provide an improved educational toy comprising a base, an active statue, a first and a second actuating mechanism within said statue, and a series of replaceable quiz and answer plates, all similar to that disclosed in said U.S. Pat. No. 3,994,078, the improvement being to provide a novel quiz device consisting of an electrical conductive bottom layer, a non-conductive marking top layer, and an intermediate circuit layer unitary sandwiched therebetween. A plurality of top opened holes are formed extending through said quiz device to said conductive bottom layer. And the question and answer plate is punched at the position corresponding to some of said holes in accordance with the question and answer combination. Two operating rods are provided for selective insertion in said holes to indicate a question and corresponding answer.

With this improved arrangement, preferred simplification is achieved. Yet when a correct answer is given, the statue will also produce an affirmative nodding and clapping action, whereas when an incorrect answer is made, the statue will render a negative wagging motion, in the same manner as described in afore-mentioned U.S. Pat. No. 3,994,078.

Other objects and advantages will become apparent from the following description with reference to the accompanying drawings, in which.

Figure 1:
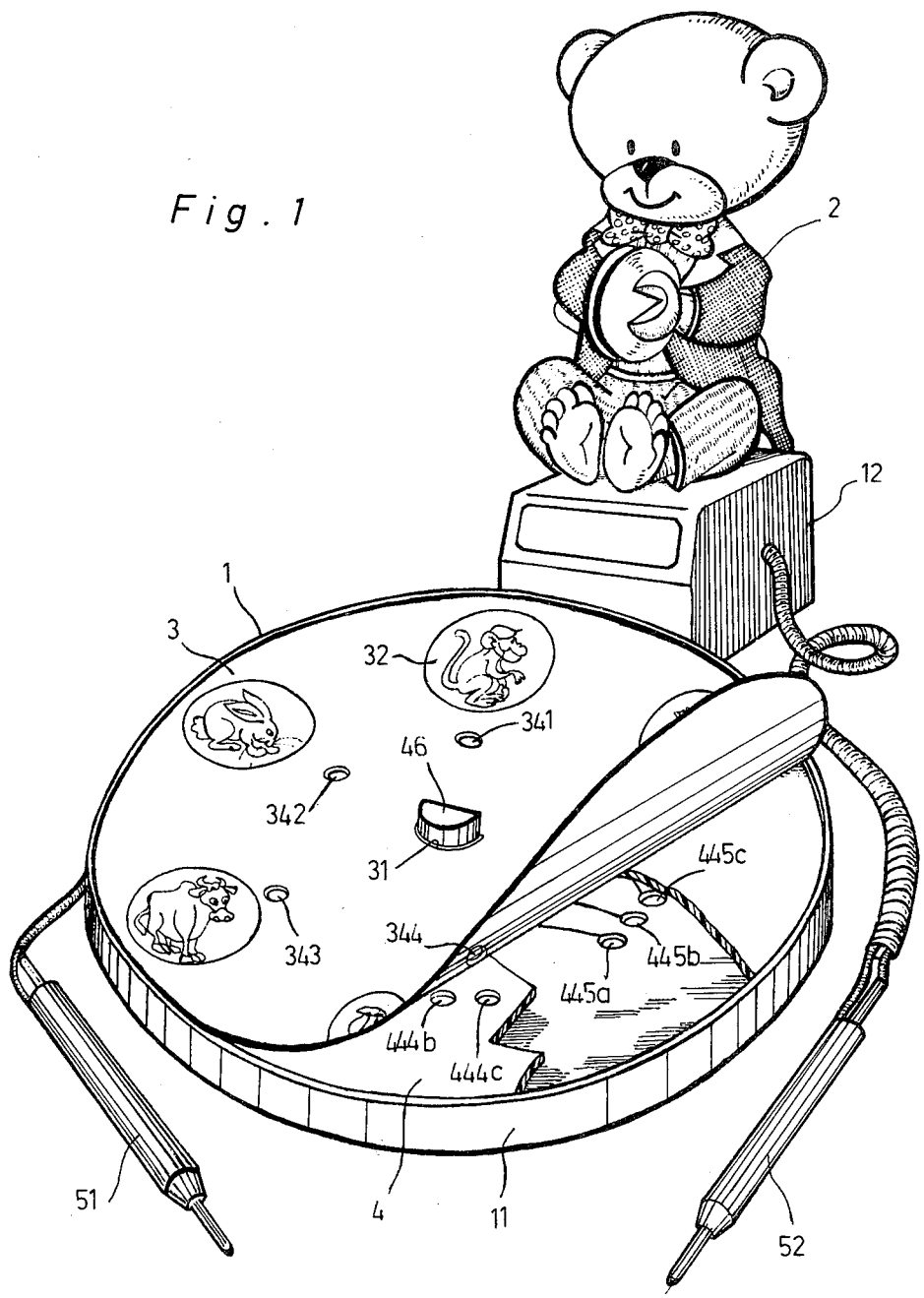
FIG. 1 is a perspective view of a preferred embodiment of the present invention, with parts broken away.

Now, with reference to FIG. 1, the base 1 consists of a quiz device base portion 11 and a statue base portion 12. The statue 2 is integrally mounted on said base portion 12. The quiz and answer plate 3 has a central semicircle hole 31 and is printed with a plurality of relative question indicia 32 and answer indicia 33 in the form of illustration, character, mathematical calculation etc. This plate 3 can be of various kinds of expression with unlimited pieces for replacement in order to give a desirable educational effect upon the knowledge level of children.

Figure 2:
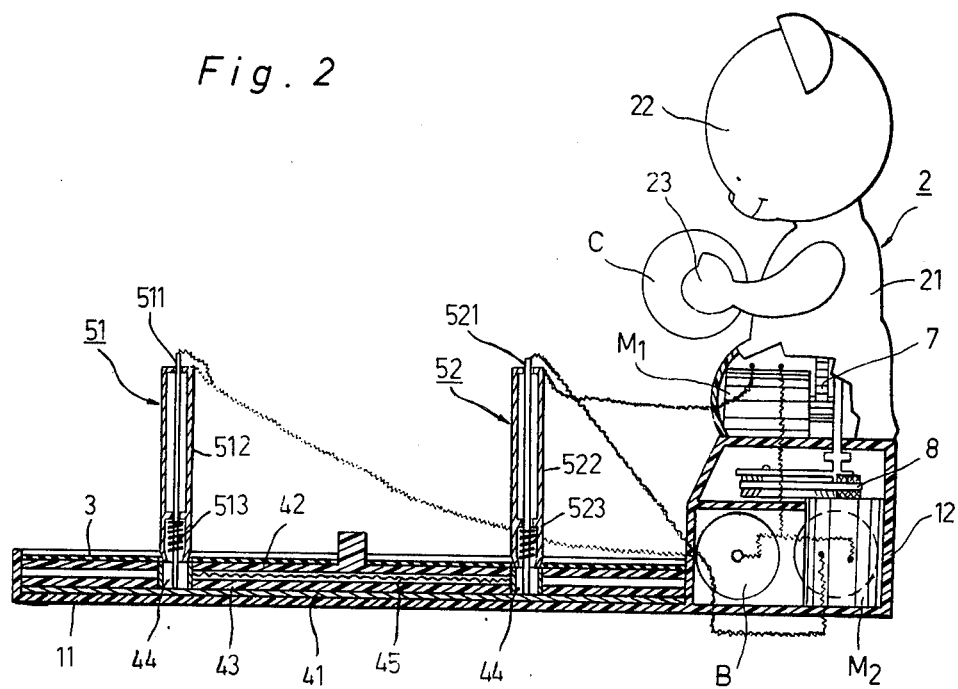
FIG. 2 is a sectional view of FIG. 1, with parts broken away.
Figure 3:
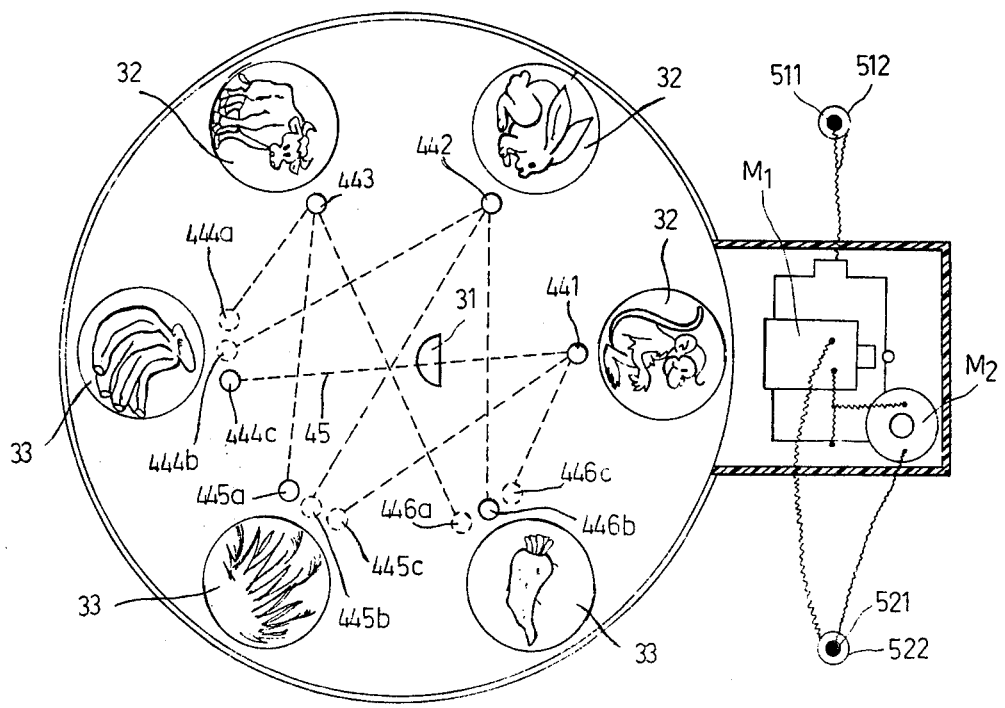
FIG. 3 is a top view with a partial cross-section at the statue base portion, schematically illustrating the circuit connection.

Under the quiz and answer plate 3 is arranged a quiz device 4 inside of said base portion 11. As better shown in FIG. 2, the quiz device 4, which can be circular or other configuration, consists of an electrical conductive bottom layer 41, a non-conductive marking top layer 42, and an intermediate circuit layer 43 sandwiched between said layers 41 and 42. There are a plurality of top opened holes 44 including, for example, holes 441, 442 and 443 each positioned corresponding to question indicia 32 and holes in groups 444a,b,c, 445a,b,c and 446a,b,a in such manner that each group is positioned corresponding to one answer indicia 33, as best shown in FIG. 3. The circuits 45 electrically connect each question indicia corresponding holes 441, 442 or 443 to each one hole in every answer indicia corresponding hole groups, for example, connect 441 to 444c, 445c and 446c, 442 to 444b, 445b and 446b, and 443 to 444a, 445a and 446a. Accordingly, these connections can be alternatively varied, and not necessary limited thereto. Each hole 44 extends through the whole quiz device to the conductive bottom layer 41 which may be copper or the like. The intermediate circuit layer 43 is non-conductive except for the circuits 45 arranged thereon. This layer 43 can be made by means of a printed circuit plate. For better understanding the circuits 45 are represented by straight lines crossed over each other, but actually the circuits 45 are not intercepted by each other. At the center of said quiz device there is provided a semi-circular stud 46 for setting and fixing the plate 3.

The quiz and answer plate 3 has punched therein holes 341, 342 and 343 each representing one question indicia 32, which are coincident with the aforementioned holes 441, 442 and 443, respectively. But at the corresponding answer indicia 33 side, the holes 344, 345 and 346 (only 344 is shown) are punched at the position coincident with, for example, the holes 444c, 445a and 446b according to the quiz and answer combination.

Inside the statue body 21, there is a first actuating mechanism 7 driven by the motor $M_1$ to actuate the statue head 22. A pair of cymbals C is held in the hand 23. A second actuating mechanism 8 is arranged inside of the statue base portion 12 and driven by the motor $M_2$. Said first and second actuating mechanisms 7 and 8 are identical with that disclosed in U.S. Pat. No. 3,994,078, so that the details are omitted here. The specification of U.S. Pat. No. 3,994,078 is referred to for details.

There are two operating rods 51 and 52 for indicating the question and answer. Each rod consists of a core 511 or 521, a shell 512 or 522, and an expansion spring coil 513 or 523 arranged inside of the shell 512 and 522, respectively, and retained by a tapered end thereof.

One side of a battery B is connected to both core 511 and shell 512 of quiz rod 51, while another side thereof is connected through parallel motors $M_1$ and $M_2$ to the core 521 and shell 522 of answer rod 52, respectively.

With the construction mentioned above, the present invention can be operated, first of all, by inserting the rod 51 into, for example, the hole 341 to indicate a question such as "What is preferred by the Monkey?" The rod 52 is then inserted into a selected answer hole for example 344, which is a indication of "Banana". As soon as the tip of core 521 comes in contact with bottom layer 41, the negative circuit system consisting of core 511, battery B, motor $M_2$ core 521 and layer 42 is closed, whereby the second actuating mechanism 8 is actuated by the motor $M_2$ to make the statue head 22 wag. However when a slight force is exerted on the shells 512 and 522 against the spring coil 513 and 523, respectively, said shell 522 is contacted with the hole 444c which is electrically connected to hole 441 by circuit 45, so that the positive circuit system consisting of shell 512, battery B, motor $M_1$, shell 522 and circuit 45 is also closed, whereby the first actuating mechanism 7 is also actuated by said motor $M_1$ to make the statue head 22 nod and the arms 23 clap. Since the momentum of nodding is greater than wagging, it therefore appears to indicate approval only and eliminates any impression of disapproval.

On the other hand, if the rod 52 is inserted into the hole 345 or 346, and even if force is exerted on both shells 512 and 522, since there is no circuit connection between holes 441 and 445a or 446a, the said positive circuit system will still be open and the first actuating mechanism 7 will not be actuated therefore, only disapproval by wagging of the head 22 is indicated.

The above embodiments are given only for illustrative purposes and not by the way of limitation. Any variations and modifications evident to those skilled in the art will fall within the scope of the attached claims.

What we claim is:

1. An educational toy comprising:

a base comprising a quiz device base portion and a statue base portion:

an active statue mounted on said statue base portion, said statue having a movable head portion and two resilient arms;

a pair of operating rods;

a first actuating mechanism including a first drive motor connected to said head portion and to said resilient arms for producing a nodding motion of said head portion and a clapping motion of said arms upon activation of said first drive motor;

a second actuating mechanism including a second drive motor connected to said head portion for producing a a wagging motion of said head portion upon activation of said second drive motor; said rods being electrically connected to said mechanisms;

an electrical power source connected to said first and second actuating mechanisms;

a series of replaceable question-and-answer plates selectively mountable over said quiz device base portion, each plate having a plurality of indicia thereon each representing a question and a plurality of related indicia each representing an answer, and every indicia has a corresponding punched hole;

a quiz device arranged under said question-and-answer plate comprising an electrical conductive bottom layer, a non-conductive marking layer, and an intermediate circuit layer sandwiched therebetween, a plurality of top opened holes formed extending through said device to said bottom layer, said holes being distributed and positioned corresponding to the punched holes of said question-and-answer plate, a circuit being connected between holes corresponding to said question indicia and holes corresponding to said answer indicia, such that when one of said operating rods is inserted into a hole to indicate a question and the other rod is inserted into the wrong hole to give an incorrect answer, the second actuating mechanism is activated to cause said head portion to wag to-and fro, and when said other rod is inserted into the right hole to give a correct answer, then in addition to said second actuating mechanism said first actuating mechanism is also activited to cause said head portion to nod and said arms to clap to such extent that it dominates over said wagging motion caused by said second actuating mechanism.

2. A toy according to claim 1, wherein the holes are so distributed that one hole is positioned corresponding to one question indicia while one group is positioned corresponding to one answer indicia, said group consisting of a plurality of holes in the number corresponding to the answer to be selected.

* * * * *